United States Patent [19]

Monte

[11] Patent Number: 5,659,058
[45] Date of Patent: Aug. 19, 1997

[54] THERMALLY STABLE ANTISTATIC AGENTS

[75] Inventor: Salvatore Joseph Monte, Staten Island, N.Y.

[73] Assignee: Kenrich Petrochemicals, Inc., Bayonne, N.J.

[21] Appl. No.: 455,272

[22] Filed: May 31, 1995

[51] Int. Cl.$^6$ .................. C07F 7/00; C07F 7/28
[52] U.S. Cl. .......... 556/56; 252/8.61; 252/8.84; 524/157; 524/159; 524/160; 524/161; 524/162; 524/163; 524/164; 524/165; 524/166; 524/204; 524/535; 524/912; 524/913; 525/254; 525/274
[58] Field of Search ............ 524/160, 162, 524/166, 171, 204, 532, 535, 912, 913, 159, 161, 163, 164, 157, 165; 525/254, 274; 556/56; 252/8.7, 8.8

[56] References Cited

U.S. PATENT DOCUMENTS

| | | | |
|---|---|---|---|
| 2,935,522 | 5/1960 | Samour | 556/56 |
| 4,069,192 | 1/1978 | Monte et al. | 556/56 X |
| 4,087,402 | 5/1978 | Monte et al. | 556/56 X |
| 4,122,062 | 10/1978 | Monte et al. | 556/56 X |
| 4,600,789 | 7/1986 | Sugerman et al. | 556/56 X |
| 4,623,738 | 11/1986 | Sugerman et al. | 556/56 X |
| 4,715,968 | 12/1987 | Sugerman et al. | 524/912 X |
| 4,816,522 | 3/1989 | Sugerman et al. | 556/56 X |
| 5,026,767 | 6/1991 | Inoue et al. | 524/170 X |
| 5,045,580 | 9/1991 | Kitamura | 524/166 X |
| 5,157,062 | 10/1992 | Koyama et al. | 524/166 |

FOREIGN PATENT DOCUMENTS

| | | | |
|---|---|---|---|
| 2159834 | 6/1973 | Germany | 524/912 |
| 0034191 | 9/1974 | Japan | 524/912 |

*Primary Examiner*—Judy M. Reddick
*Attorney, Agent, or Firm*—Darby & Darby

[57] ABSTRACT

A process for rendering polymer compositions antistatic and the products of such process are described. The polymeric material is treated with a combination of selected trineoalkoxy amino zirconates and trineoalkoxy sulfonyl zirconates. These latter materials are soluble in the polyolefins, polyesters, polyamides, polyethers, polycarbonates, and polystyrenes and remain stable during the processing of these polymers. Furthermore, the antistatic agents of the invention are thermally stable to temperatures up to 825° F., do not "bloom" during the polymer processing, and are colorless, permanent, non-blooming and non-moisture dependent.

16 Claims, No Drawings

THERMALLY STABLE ANTISTATIC AGENTS

Most conventional commodity polymers such as polyethylene, polystyrene, and nylon are inherently insulators as it relates to electrical charge transfer exhibiting resistivity readings (ohm-cm) of from $1\times10^{16}$ to $1\times10^{18}$ ohm-cm. Electrical charges which may be built up in the polymer from sources such as frictional energy cannot be readily dissipated. Therefore, it is useful to impart conductance to the polymer through additives which will lower the polymer's resistivity readings to a range from $1\times10^{15}$ to $1\times10^{6}$ ohm-cm. It is generally accepted that polymer composites having resistivity readings of $1\times10^{1-2}$ ohm-cm are "conductive", $1\times10^{3-6}$ ohm-cm are "semi-conductive", and $1\times10^{7-12}$ ohm-cm are "antistatic".

It is desirable to prevent static electricity build-up on polymeric materials. For example, in the case of textile materials such as carpets, static electricity builds up when people walk on the carpet, thereby resulting in uncomfortable electric shocks when the walker touches a grounded object. Furthermore, when such static electricity builds up on polymeric material associated with computing equipment (e.g., cabinets and other enclosures), loss of data on electromagnetic media, damage to equipment, and a fire hazard may result.

Conventional antistatic agents have been used to increase the conductivity of polymeric materials to some degree, in order to permit the dissipation of the static electric charges. They may be classified into three general categories as follows:

1. Hygroscopic surfactants such as tertiary fatty amines and their ammonium salts, monoacyl glycerides, monoalkyl and dialkyl phosphates, and sulfonamides which work by blooming to the polymeric surface and attracting a conductive film of atmospheric moisture. Certain antistatic performance standards are based on the natural resistivity of the conductive film of atmospheric moisture. This film alone provides surface resistivity readings of $1\times10^{9-10}$ ohm-cm, though the underlying hydrophobic polymer has a volume resistivity of $1\times10^{16-18}$ ohm-cm.
2. Conductive particulates, fibers and/or inserts which rely on the inherent conductivity of metals or carbon black to dissipate the electrostatic charge.
3. Metallocenes such as bis(methyl)cyclopentadienyl cobalt which provide a low energy ($10^{9-10}$ ohm-cm) transfer of electrons between adjacent aromatic layers.
4. Antistatic agents based on combinations of neoalkoxy organometallics. Minor amounts of combined mononeoalkoxy titanates and/or zirconates can be added directly into the polymer during the compounding phase to form a non-blooming organometallic electron transfer circuit to provide an antistatic effect which works independently of atmospheric moisture. These antistats are described in U.S. Pat. 4,715,968 and the Ken-React Reference Manual by S. J. Monte, published February, 1987—Revised Edition.

Electrostatic Dissipation phenomena was once primarily an aesthetic nuisance typically associated with such low power annoyances as the generation of a spark/shock while approaching a light switch after crossing a synthetic yarn carpet under low humidity conditions. The need for ESD through the use of antistatic agents has assumed an important status as a consequence of massive increase of the usage of low power, high information density electronics (such as microcomputers) in most office environments, and electronically controlled utilities in home, office, commercial, and industrial areas. The sensitivity of microcircuitry to static-generated noise, and consequent information loss, has become a severe problem since the packing density of information on microchips has increased in the past decade from approximately 1,000 bytes per square centimeter to, in some cases, one billion bytes of information in the same area, with a proportional reduction in the energy level available per unit of information. Also, typical of radiant energies requiring ESD are those produced from a fluorescent light source, or incompletely shielded electronic equipment such as TVs, radios, telephones, and the like. Therefore, electrostatic (noise) dissipation requirements exist when charges accumulate from frictional, broadcast type wave energy or radiant energy into ungrounded or poorly grounded materials.

The resultant charge generation may be minimized or dissipated by conducting excess electrons to ground and/or neutralizing positive holes by return of electrons from ground. Such grounding requires that a resistance not greater than approximately $10^{10}$ ohm-cm be maintained along the entire grounding path of the polymer whose underlying volume resistivity is $10^{16-18}$ ohm-cm.

From a functional viewpoint, resistivities of $10^{10}$ ohm-cm or less commonly occur with cellulosic material at relative humidities above approximately 25%, since cellulosics tend to absorb water strongly, thereby providing a conductive surface layer for ESD protection. However, less polar polymeric materials such as the polyolefins and styrenics and, to a modest degree, somewhat more polar materials such as polyethers, ABS, and vinyls require the addition of antistatic agents to render them adequately conductive.

The materials heretofore in the prior art, though somewhat effective, had certain disadvantages.

The hygroscopic surfactants are humidity-dependent since they work on the chemical principle of limited polymer solubility, thereby blooming to the polymeric surface to provide sites for water absorption from the atmosphere resulting in an aqueous conductive layer ($10^{9-10}$ ohm-cm) for static discharge along the non-conductive polymeric material surface. The following four classes illustrate these materials: a tertiary fatty amine and its quaternary ammonium salt (trilaurylammonium stearate); a monoacyl glyceride (glycerol monostearate); a monoalkyl phosphate (stearyl phosphate); and a sulfonamide (dodecylbenzenesulfonamide).

One problem with hygroscopic surfactants is their variable performance caused by the changes in humidity. Another limitation is their comparatively low decomposition temperatures, often being destroyed during polymer processing.

Also, reliance on surface bloom has its drawbacks: first and foremost, its tendency to be removed as a consequence of frictional wear; secondly, a tendency to reduce quality of the surface finish by haze formation resulting from concentration of the antistat on the surface; and thirdly, a tendency of protection to be removed as a consequence of extraction by solvent or water or surfactant. These limitations restrict these types of antistats to those applications in which protection is required only for a relatively short period or for those applications in which the antistat may be reapplied periodically from an external source to maintain desired levels of protection. Their advantage is their low cost ($1.50 to $3.50/lb.) with low use levels of from 100 to 2000 ppm.

Conductive particulates, fibers and/or inserts are widely used to provide permanent antistatic protection to provide a low resistance pathway. Such systems normally suffer from the requirement that substantial volume fractions of from 4 to 60% conductor by weight of polymer must be employed in order to achieve the desired level of ESD. The high levels of conductive particulate additive tend to significantly reduce the transparency and performance characteristics of the plastics involved as a consequence of crystal dislocation, dilution, and/or energy concentration with resultant loss of impact strength.

A means for ameliorating these behavior patterns is to utilize a relatively long conductive fiber to provide mechanical reinforcement, as well as electrical conductivity to the matrix resin. However, such conductive fibers tend to be rather expensive, and as a consequence, little used, except where cost/performance benefits tend to represent substantial value added situations.

Metallocenes are the primary example of the third type of antistats in commercial use today. These include bis(methyl) cyclopentadianyl cobalt and its analogs. These materials have been shown to provide, at relatively high levels (8–15 wt. percent) in polyolefins, very effective, although expensive, ESD protection when employed at temperatures below approximately 400° F., above which temperature thermolysis tends to destroy their efficacy.

Usage of metallocenes has thus far been restricted to relatively low melting polyolefin compositions as a consequence of their limited thermal stability, high dosage requirements, high price, strong coloration (many of the metallocenes are strongly absorbent in the blue and violet ranges of the spectrum), and the solvent extractability of such materials, especially from thin films.

The fourth class of antistats, combinations of neoalkoxy triamino and trisulfonyl titanates and zirconates known commercially as Ken-Stats (a trademark of Kenrich Petrochemicals, Inc.), are described in U.S. Pat. No. 4,715,968. These materials are functional antistatic agents for certain polyolefinic, substituted polyolefinic, polystyrenic, and polyester polymers. They form an internal electronic circuit which is non-blooming, is non-water-dependent, and is often beneficial to polymer properties.

Like the metallocenes, they form soluble complexes of moderate mobility within the resin matrix. However, unlike the poorly conductive metallocenes, the individual components tend to orient in alternating bipolar charge layers which result in a very low band width gap, hence, low resistance to electron transfer. The formation of these bipolar layers tends to inhibit migration once established. As a consequence, the ability to extract low levels of the components from the resin matrix is significantly impeded.

These materials, formed of components having a plurality of hydrophilic groups, while outstanding in certain polymeric materials, suffer from certain drawbacks. Firstly, they are not sufficiently thermally color stable to be processed at high temperatures such as 400° F. and above, as is required by certain polymers, e.g., low melt polyolefins, polycarbonates. Secondly, they produce an unpleasant odor. And, finally, they impair the transparency, particularly on aging, of clear film and solid articles, a major disadvantage where crystal clarity is desired and must be maintained for the functional life of the article.

For example, Ken-Star MNT (trademark of Kenrich Petrochemicals, Inc.) (based on combined mono neoalkoxy triamino and trisulfonato titanates) works well in polymer systems processed below 365° F. and where long term aging discoloration is acceptable. The thermal limitation of the mononeoalkoxy titanate-based Ken-Stat is not based on its intrinsic conductivity, but the breakdown of its color appearance which begins at 350° F. and is completed by 365° F. Titanates also form color bodies in the presence of phenolic based additives and will somewhat retard the effectiveness of peroxide free radical cured thermoset polymers.

BRIEF DESCRIPTION OF THE INVENTION

It has now been discovered that trineoalkoxy monoamino zirconate and trineoalkoxy monosulfonyl zirconate combinations (hereinafter "TNZs") are outstanding antistatic agents for polycarbonates, polyolefinic, substituted polyolefinic, polystyrenic, polyether and polyester polymers, particularly where high thermal stability, i.e., over 750° F., is required. The use of such an antistatic agent permits the formation of film substantially free of discoloration initially or on aging. Additionally, the TNZ antistatic agents of the invention do not adversely affect light transmission and are odor-free as compared with the mononeoalkoxy titanate/zirconate antistats of the prior art.

For example, preferred TNZ materials may be used for the processing of polymers up to 825° F.

The amount of the antistat of the invention needed to provide ESD effects is that which will provide a continuous, dense, and completely solubilized atomic electronic circuit.

A dosage level of 0.3 to 8.0% of the liquid antistat, based on the weight of the polymer, is generally used. If significant proportions of non-conductive particulate such as pigment of filler are present (i.e., in excess of 5 vol. % in the compound), higher proportions of the antistatic agent may be required in order to achieve adequate ESD activity. The liquid antistatic agent may also be admixed with silica to produce a 60% active masterbatch in powder form so as to facilitate dispersion and handling. 35 to 90 wt. %, preferably, 37 to 63 wt. % of silica, based on the total weight of the zirconate compounds, is used. Some suggested dosage ranges are:

| Polymer | % TNZ |
| --- | --- |
| LLDPE | 2.0 to 4.0 |
| HDPE | 0.7 to 3.0 |
| PP | 2.3 to 4.0 |
| PETG | 1.3 to 6.0 |
| Nylon | 4.0 to 6.0 |
| PES | 6.0 to 8.0. |

A dosage of 4.0% is suggested for initial screening for most polymers.

TNZs work on the principle of solubilization of minor amounts of dissimilar organometallics into the polymer binder phase. Mixing and machine conditions are important to successful application of the TNZ. Both excellent distribution (below the polymer melt temperature) and dispersion (above the polymer melt temperature) of the TNZ are necessary to optimize effectiveness.

If the TNZ is to be distributed into the unmelted polymer phase by powder blending, then the powder blending must be intensive to insure uniform distribution. Dry blend techniques such as drum rolling or dumping all at once of the liquid TNZ into a ribbon blender with short mix times will give poor results. The TNZ powder form helps prevent localization to provide more uniform distribution. It is also possible to masterbatch the TNZ further to produce a 20% active pellet masterbatch.

During the flux phase, there should be sufficient back pressure and mechanical shear so as to allow the TNZ to both solubilize and be mechanically dispersed into the polymer.

DETAILED DESCRIPTION OF THE INVENTION

A wide variety of thermoplastic polymers, elastomeric resins, and thermosetting resins and coatings may be treated in accordance with the invention. Examples of thermoplastic polymers are ABS; acetal; acrylic; cellulose esters (CA/CAB); ethylene copolymers (EAA/EEA) (EVA/EVOH); fluorocarbon; phenolics (PPO/PPS); polyamides (nylon)/imides; polycarbonate; polyester (PBT/PET); polyester elastomers; polyethers (PEEI) (PEEK/PEES); polyolefin (HDPE/LLDPE/PP), XLDPE; polysulfone; polyurethane; rigid PVC; flexible and plastisol PVC; styrenics (GPPS) (HIPS) (SA/SMA); and SB (TPR). Examples of elastomeric resins are EPR, EPDM; IIR, SBR; EPDM, SBR; NR, nitrile; CPE; chloroprene fluorocarbon; chlorosulfonated polyethylene; halo butylene; silicone; polysulfide resins and coatings are. Examples of thermosetting resins and coatings are acrylic; alkyd (long oil); alkyd (short oil); epoxy; epoxy ester; furane; nitrocellulose; phenolics; unsaturated polyester; saturated polyester; urethane; and vinyl ester. For a full discussion of the applicable polymers, see Charrier, *Polymeric Materials and Processing*, Hanser Publishers, New York (1991), the disclosure of which is incorporated by reference herein.

The applicable polyolefinic polymers which may be treated with the antistats of the invention include homopolymers made by the polymerization of monoolefins having from 2 to 6 carbon atoms, diolefins having from 4 to 10 carbon atoms, and copolymers and terpolymers thereof. Examples of such materials are high and low density polyethylene, LLDPE, polypropylene, HDPE, polybutylene, ethylene-propylene copolymers, ethylene-butylene copolymers, and terpolymers of ethylene, a second olefin such as propylene or butylene, and a minor amount of a diene termonomer such as ethylidene norbornene, cyclopentadiene, and hexadiene-1,6.

The polyesters which may be advantageously employed in conjunction with the antistats of the instant invention are polycondensation products of aliphatic diols and/or triols with aliphatic and/or aromatic dibasic and/or tribasic acids as well as polyamides, e.g., nylons 6, 6/6, 6/10, 6/12, 11, 12. Individual polyesters as a consequence of their composition may optionally be subjected to secondary cure (thermoset) application for selected applications after admixture with the antistats of the instant invention.

The useful polystyrenic polymers are polymers formed by the polymerization of styrene, alpha-methyl styrene, and copolymers of the aforesaid materials with acrylonitrile, butadiene, and with acrylonitrile and butadiene.

The antistatic agents useful in this invention are a combination of compounds having the following formulas:

(I)

(II)

wherein R, $R_1$, $R_2$ are each a monovalent alkyl, alkenyl, alkynyl, aralkyl, aryl or alkaryl group having up to 20 carbon atoms or a halo- or ether-substituted derivative thereof; and A is either an oxyalkylamino —(—O-$R_4$-N($R_5$)($R_6$)) or an oxyaryl amino —(—OArN($R_5$)($R_6$)) group, and B is a arylsulfonyl (ArS(O)$_2$—O)— or an alkyl sulfonyl (R- S(O)$_2$O—) group.

The various R, $R_1$, and $R_2$ may each contain up to three ether oxygen or halogen substituents, provided the total number of carbon atoms for each such R group does not exceed 20, inclusive of the carbon atoms contained in substituent portions. Preferably, the R group in the alkyl sulfonyl group contains from 1 to 8 carbon atoms.

$R_4$ is a divalent alkylene group which many contain in the chain oxygen and nitrogen atoms, e.g., a-$C_2H_4NHC_2H_4$-group.

$R_5$ and $R_6$ may be hydrogen or hydrocarbyl groups as defined for R, $R_1$ and $R_2$ above. Preferably, $R_5$ and $R_6$ are hydrogen, i.e., the terminal amino group has primary functionality as opposed to secondary or tertiary.

Ar, in the above formulas, may be a monovalent aryl or alkaryl group having from 6 to about 20 carbon atoms, optionally containing up to 3 ether oxygen substituents, and substituted derivatives thereof wherein the substitutions are up to a total of three halogens or amino groups having the formula $NR_8R_9$ wherein $R_8$ and $R_9$ are each hydrogen, an alkyl group having 1 to 12 carbon atoms, an alkenyl group having from 2 to 8 carbon atoms, a cycloalkyl group having from 3 to 12 carbon atoms, and an aryl group having from 6 to 12 carbon atoms. Preferably Ar is a phenylene group having a long chain alkyl substitution having from 8 to 18 carbon atoms.

The most preferred embodiments of the instant invention are combinations of either zirconium IV [2,2(bis 2-propenolato-methyl) butanolato], dodecylbenzenesulfonato-O or its titanium IV analog with zirconium IV [(2,2-bis 2-propenolatomethyl) butanolato] 2-ethylenedimethylamino ethanolato. It will be understood that the aforesaid results may also be obtained by using a molecule which contains both the amino and sulfonyl moieties.

Generally, from 100 to 80,000 ppm of the antistatic agents is added to the polymer, preferably from 200 to 4500 ppm, In the case of polyolefinic and polyester materials, most preferably from 0.2 to 1.8 moles of the trineoalkoxy amino zirconate compound (TNAZ) should be used in combination with each mole of the trineoalkoxy sulfonyl zirconate (TNSZ) compound. With reference to the polystyrenic compounds, it is preferred that from 0.5 to 1.6 moles of the TNSZ should be used with each mole of the TNAZ.

By the practice of the instant invention, an excellent non-blooming antistatic composition is obtained. Typically, in the case of polyethylene, the resistivity is reduced from $10^{16}$ ohm-cm without the antistatic agent to $10^{11}$ to $10^9$ ohm-cm with the antistatic agent of the invention. In the case of one thermoset (amide-cured) polyester coating, the resistance was reduced from 1200 to approximately 110 ohm-cm. Polystyrenics are reduced from an untreated resistivity of $10^{14}$ ohm-cm down to $10^{11}$ to $10^2$ ohm-cm. As will be readily understood by those skilled in the art, this decrease in resistivity permits the dissipation of static charges (ESD).

The antistatic compositions of the invention are particularly novel since the antistatic agent is not destroyed even though the polymeric material may be optionally compounded at high temperatures, namely, between 350° and 825° F.

Where the compositions are subject to little thermal stress (that is, formulated, processed, applied, and used at temperatures less than 300° F.) and admixed with inert solvents such as ethers and hydrocarbons, the broad range of combinations such as described in Formulas I and II above may be used as the antistatic agent.

The formulated antistatic compounds of the instant invention may optionally also contain organic or inorganic particulate materials, e.g., silica. When significant proportions of particulate are present (i.e., in excess of about 5 vol. %), higher proportions of the TNZ may be required in order to achieve adequate ESD activity, In order to more fully illustrate the advantages of the instant invention, the following examples are set forth. The additives employed are denoted by the codes in Table A.

TABLE A

| Additives | Molecular Weight |
|---|---|
| A Zirconium IV tris [(2,2 bis methyl)propanolato], methanesulfonato-O $[(CH_3)_3C-CH_2-O]_3-Zr-O-S(O)_2-CH_3$ | 447 |
| B Zirconium IV tris [(2,2 bis 2 propenolatomethyl) butanolato], dodecylbenzenesulfonato-O $[CH_3-CH_2-C(CH_2=CH-CH_2-O-CH_2)_2-CH_2-O]_3-Zr-O-S(O)_2-C_6H_4-C_{12}H_{25}$ | 1055 |
| C Zirconium IV tris-2-propanolato, dodecylbenzene sulfonato-O $[(CH_3)_2-CH_2-O]_3-Zr-O-S(O)_2-C_6H_4-C_{12}H_{25}$ | 593 |
| D Zirconium IV tris-2-propanolato, (2-ethylenediamino) ethanolato $[(CH_3)_2-CH_2-O]_3-Zr-O-CH_2-CH_2-NH-CH_2-CH_2-NH_2$ | 371 |
| E Zirconium IV tris [(2,2-bis 2-propenolatomethyl) butanolato], 2-ethylenediamino ethanolato $[CH_3-CH_2-C(CH_2=CH-CH_2-O-CH_2)_2-CH_2-O]_3-Zr-O-CH_2-CH_2-NH-CH_2-CH_2-NH_2$ | 833 |
| F Zirconium IV tris [(2,2-bis 2-propenolatomethyl) butanolato], 3-aminophenylato $[CH_3-CH_2-C(CH_2=CH-CH_2-O-CH_2)_2-CH_2-O]_3-Zr-O-C_2H_4-NH_2$ | 838 |

To further illustrate the subject invention, the following examples are set forth:

COMPARATIVE EXAMPLE A

Organo-Titanium Compounds

Combinations of dodecylbenzenesulfonic and primary aliphatic amino ligands built around titanium centers, shown in Table B, were converted from their 100% liquid form to highly saturated powdered masterbatches on fine surface silica having an approximate 60% active liquid activity.

TABLE B

| ORGANO-TITANATE CODES | |
|---|---|
| MNT = MNAT + MNST | = $(N)_1Ti (A)_3 + (N)_1Ti (B)_3$ |
| DNT = DNAT + DNST | = $(N)_2Ti (A)_2 + (N)_2Ti (B)_2$ |
| TNT = TNAT + TNST | = $(N)_3Ti (A)_1 + (N)_3Ti (B)_1$ |
| MNAST | = $(N)_1Ti (A)_2(B)_1 + (N)_1Ti (A)_1(B)_2$ |
| DNMAMST | = $(N)_2Ti (A)_1(B)_1$ |
| DADST | = $(A)_2Ti (B)_2$ | where

N is $[CH_3-CH_2-C(CH_2=CH-CH_2-O-CH_2)_2-CH_2-O-$

A is $-O-CH_2-CH_2-O-CH_2-CH_2-N(CH_3)_2$ and

B is $-O-S(O)_2-C_6H_4-C_{12}H_{25}$

Ten percent of the powder masterbatched organometallic titanate combinations were incorporated into EVA (USI Chemicals Co.—Microthene MU 763000) on a two roll mill heated by high pressure (150 psi) steam at 325° F. and then pressed into 0.15 mm thick sheets on a electrically heated hydraulic press at 325° F. and 40,000 psi, Four surface and volume resistivity readings on each side were made using a Dr. Thiedig Model 96071-MILLI-TO 2 ohm-meter for each of the test sheets and the results of the lowest of the four readings for each side are shown in Table C:

TABLE C

| Titanate combinations | Resistivity, ohm-cm | |
|---|---|---|
| | Surface | Volume |
| TNT[a] Side | | |
| 1 | $0.82 \times 10^{11}$ | $2.38 \times 10^8$ |
| 2 | $0.80 \times 10^{11}$ | $4.14 \times 10^8$ |
| DNT[a] Side | | |
| 1 | $5.53 \times 10^{10}$ | $3.60 \times 10^6$ |
| 2 | $4.40 \times 10^{10}$ | $5.10 \times 10^6$ |
| MNT[a] Side | | |
| 1 | $1.14 \times 10^{10}$ | $9.58 \times 10^5$ |
| 2 | $0.93 \times 10^{10}$ | $8.32 \times 10^5$ |
| MNAST[a] Side | | |
| 1 | $3.81 \times 10^9$ | $8.12 \times 10^5$ |
| 2 | $4.69 \times 10^9$ | $1.30 \times 10^6$ |
| DNMAMST[a] Side | | |
| 1 | $3.43 \times 10^9$ | $8.53 \times 10^5$ |
| 2 | $4.64 \times 10^9$ | $1.32 \times 10^6$ |
| DADST[b] Side | | |
| 1 | $1.07 \times 10^{11}$ | $3.90 \times 10^{13}$ |
| 2 | $0.93 \times 10^{11}$ | $2.47 \times 10^{11}$ | a. = 60% active TNT on silica.
b. = 70% active DADST on silica.

Although the conductivity readings as shown in Table C were excellent, the aged appearance and color of the EVA films were not acceptable commercially for applications requiring maintenance of film clarity. While there may be commercially interesting applications for conductive polymers containing the combined titanate based materials, this would only be where clarity is not a requirement.

EXAMPLE A

Preparation of Organo-Zirconate Compounds

To simplify the presentation, the following codes are used to describe the zirconate compounds and formulations discussed herein:

TABLE D

ORGANO-ZIRCONATE CODES

| | |
|---|---|
| MNZ = MNAZ + MNSZ | = $(N)_1Zr\ (A)_3 + (N)_1Zr\ (B)_3$ |
| DNZ = DNAZ + DNSZ | = $(N)_2Zr\ (A)_2 + (N)_2Zr\ (B)_2$ |
| TNZ = TNAZ + TNSZ | = $(N)_3Zr\ (A)_1 + (N)_3Zr\ (B)_1$ | where N, A, and B are as defined in Table B

Synthesis of TNSZ, TNAZ and their mono- and di-equivalents is based on the transesterification of tetraisopropyl zirconate with the appropriate reactants as indicated so as to yield the desired synthesized products and four moles of isopropyl alcohol by-product.

I. Preparation of Neoalkoxy Sulfonyl Zirconate

At room temperature, trimethylolpropane diallyl ether, 2-ethyl hexanol, and tetraisopropyl zirconate are added to a 22,000 ml glass distillation flask having a mechanical agitator, condensers, heating mantle, distillate trap, thermometer, and vacuum devices. Three runs are performed to prepare the intermediates for the TNZ, DNZ, and MNZ, respectively. In each case a total of four moles of trimethylolpropane diallyl ether and 2-ethyl hexanol are added for each mole of the tetraisopropyl zirconate. One, two, and three moles of the ether are added to prepare the MNZ, DNZ, and TNZ intermediate, respectively.

Next, the temperature is increased to 300° F., collecting isopropyl alcohol at atmospheric pressure (760 mm Hg). At this point the system is cooled and the unreacted isopropyl alcohol removed under vacuum.

At room temperature, a 5 gallon stainless steel reactor having a mechanical mixer, thermometer, and a cooling system, is charged with I mole of each of the intermediates and dodecylbenzene sulfonic acid is added slowly over a period of 15 to 20 minutes while mixing, keeping the temperature less than 120° F. using a water bath. For each of the intermediates, the appropriate amount of dodecylbenzene sulfonic acid is added. Specifically, for the MNZ, DNZ, and TNZ intermediates, 3, 2, and 1 mole of dodecylbenzene sulfonic acid is added. After the complete addition of the dodecylbenzene sulfonic acid, mixing is maintained an additional 10 minutes to complete reaction.

II. Preparation of the Neoalkoxy Amino Zirconates

At room temperature, trimethylolpropane diallyl ether, dimethylaminoethoxy ethanol, and tetraisopropyl zirconate are added to a 22,000 ml glass distillation flask having a mechanical agitator, condensers, heating mantle, distillate trap, thermometer, and vacuum devices. Three runs are performed to prepare the MNAZ, the DNAZ, and the TNAZ, using a ratio of the three components of 1:3:1, 2:2:1, and 3:1:1, respectively.

Next, the temperature is increased to 300° F., collecting isopropyl alcohol at atmospheric pressure (760 mm Hg). At this point the system is cooled to 285° F. and under vacuum the remaining isopropyl alcohol is withdrawn.

III. Preparation of Neoalkoxy Amino and Neoalkoxy Sulfonyl Zirconate Compositions As noted in Table D, the mono-, di-, and trineoalkoxy zirconate compounds are an admixture of the respective amino and sulfonyl compounds. These compositions are prepared by the following general procedures:

At room temperature (77° F.), 47.31 parts of the neoalkoxy sulfonyl zirconate is added to a 5 gallon stainless mixing pot having a mechanical mixer, thermometer, hot plate, and cooling system while mixing at approximately 50 rpm. The temperature is increased to 110° F. and 33.75 parts of the neoalkoxyamino zirconate is added. The temperature is increased to 160° F., cooled to 110° F., and 8.55 parts of 2-ethyl hexanol is added. After cooling to 80° F., 2.44 parts of tetra (2,2 diallyloxymethyl)butyl, di(ditridecyl)phosphito zirconate is added along with a solution of about 6 parts of neopentyl glycol in about 4 parts dimethyl hydrogen phosphite and a dispersion of about 0.02 part of sulfur in 1.98 parts of dodecylbenzene. While mixing, the temperature is again increased to 160° F. When the dispersion is complete, the mixture is cooled to room temperature under atmospheric conditions.

Table E compares the actual and theoretical yields according to the methods of manufacture described:

TABLE E

| | IPA Collected, Kg | | Conversion |
|---|---|---|---|
| Item | Theoretical | Actual | % Theoretical |
| TNZ | | | |
| TNSZ int. | 4.60 | 4.55 | 98.9 |
| TNAZ | 4.59 | 4.55 | 98.9 |
| DNZ | | | |
| DNSZ int. | 4.94 | 4.73 | 94.4 |
| DNSZ | 4.91 | 4.64 | 94.4 |
| MNZ | | | |
| MNSZ int. | 5.34 | 5.00 | 93.6 |
| MNAZ | 5.29 | 5.00 | 94.5 |

The surface resistivity of blends having various ratios to the TNSZ and TNAZ, both at 100% and in formulated compositions, is set forth in Table F:

TABLE F

| TNSZ/TNAZ Blends, | Surface Resistivity, ohm-cm 100% Neat |
|---|---|
| Non-Formulated | |
| 1 - TNSZ (100%) (M.W. = 1185) | $1.7 \times 10^8$ |
| 2 - TNSZ/TNAZ 1.0/0.2 | $3.8 \times 10^7$ |
| 3 - TNSZ/TNAZ 1.0/0.6 | $3.9 \times 10^7$ |
| 4 - TNSZ/TNAZ 1.0/1.0 | $5.9 \times 10^7$ |
| 5 - TNSZ/TNAZ 1.0/1.4 | $7.1 \times 10^7$ |
| 6 - TNSZ/TNAZ 1.0/1.8 | $6.2 \times 10^7$ |
| 7 - TNAZ (100%) (M.W. = 862) | $2.2 \times 10^8$ |
| Formulated | |
| TNZ[a] (100%) | $1.3 \times 10^7$ |
| Refluxed TNZ[b] (100%) | $3.3 \times 10^7$ |
| Mineral Oil (100%) | $1.1 \times 10^{17}$ | a) TNZ formulated and heated to 160° F.
b) TNZ refluxed at 450° F. for one hour.

EXAMPLE 1

The neoalkoxy dodecylbenzenesulfonic zirconate and a neoalkoxy primary aliphatic amino zirconate prepared as shown in Example A are formulated by mixing the MNAZ and the MNSZ at 120° F., DNSZ and DNAZ at 102° F., and TNSZ and TNAZ at 90° F. to form the MNZ, DNZ and TNZ, respectively. Table 1A shows the heats of formation:

TABLE 1A

| Neoalkoxy Zirconates | Heat of Formation, °F. | Gardner Color | Appearance @ Ambient |
|---|---|---|---|
| TNZ (TNSZ:TNAZ - 1:1) | 77 to 90 | 6 | Creamy |
| DNZ (DNSZ:DNAZ - 1:1) | 77 to 102 | 12 | Tan |
| MNZ (MNSZ:MNAZ - 1:1) | 77 to 120 | 13 | Dark Tan |

The above data show that the trineoalkoxy-based TNZ provided a superior color product when compared to the dineoalkoxy based DNZ and mononeoalkoxy MNZ.

TNZ was then compared to the prior art titanate (MNT) as to the effects of varying temperature on color appearance and weight loss after exposure in a force air oven for 30 minutes at varying temperatures. Table 1B shows the results of this comparison:

TABLE 1B

| | APPEARANCE | | NET WEIGHT OF SAMPLE[a] | |
|---|---|---|---|---|
| TEMP., °F. | MNT | TNZ | MNT | TNZ |
| 77 | Amber | Creamy | 100.00 | 100.00 |
| 350 | Dark Amber | Creamy | 97.36 | 97.60 |
| 365 | Cloudy Dark Amber | Creamy | 95.98 | 97.42 |
| 450 | Brown-Black | Creamy | 88.68 | 91.97 | a) Net weight measurement made after heated sample cooled to room temperature.

As shown in Table 1B, the MNT sample changed from amber at 77° F. to brown-black at 450° F. while the TNZ surprisingly remained unchanged in its acceptable creamy appearance over the entire temperature range of 77° F. to 450° F. Based on past experience, initial color appearance of the combined organometallic blends usually has a direct correlation to the acceptable appearance of the finished polymer film containing the combined organometallic blends.

EXAMPLE 2

In this experiment, the inherent conductivity of the combined organometallics was tested from a low level of 0.1 to 100% using the Dr. Thiedig ohm-meter. Mineral oil was used as a low molecular weight model for polyolefins since it is a compatible low level plasticizer for polyolefins, and previously found useful as a vehicle to test conductivity.

Test specimens were prepared by doctor-blading a uniform film of about 2 mil thickness of mineral oil or mineral oil/combined organometallic blend onto a 6 inch square of 1.5 nail LLDPE film and then placing the film on a ½ inch diameter electrode plate provided with the Dr. Thiedig ohm-meter. The readings obtained are set forth below:

TABLE 2

| Items Tested | Surface Resistivity, | | Test Settings | |
|---|---|---|---|---|
| @ 77° F. | ohm-cm | | Voltage | Range |
| 100% Mineral Oil | $4.1 \times 10^{17}$ | | 500 | 2 T/200 K |
| Organometallics in 97.5% Mineral Oil | MNT | TNZ | | |
| 0.1% | No Reading* $2.1 \times 10^{15}$ | | 100 | 2 T/200 K |
| 0.5% | No Reading* $1.6 \times 10^{13}$ | | 10 | 200 G/20 K |
| 1.0% | No Reading* $2.5 \times 10^{12}$ | | 10 | 200 G/20 K |

TABLE 2-continued

| Items Tested | Surface Resistivity, | | Test Settings | |
|---|---|---|---|---|
| @ 77° F. | ohm-cm | | Voltage | Range |
| 2.0% | No Reading* $2.2 \times 10^{12}$ | | 10 | 200 G/20 K |
| 2.5% | No Reading* $7.5 \times 10^{10}$ | | 10 | 2 G/200 |
| 5.0% | $2.6 \times 10^9$ | $9.2 \times 10^9$ | 10 | 200 M/20 |
| 10.0% | $3.1 \times 10^9$ | $9.5 \times 10^9$ | 10 | 200 M/20 |
| 25.0% | $5.8 \times 10^9$ | $1.7 \times 10^9$ | 10 | 200 M/20 |
| 50.0% | $2.6 \times 10^8$ | $2.3 \times 10^9$ | 10 | 20 M/2 |
| 100.0% | $1.1 \times 10^7$ | $1.6 \times 10^7$ | 10 | 2 M/200 M |

*A suitable film for testing could not be produced.

Table 2 shows that 2.5% of TNZ in 97.5% mineral oil provides a resistivity reading of $7.5 \times 10^{10}$ ohm-cm as compared to $4.1 \times 10^{17}$ ohm-cm for the 100% mineral oil control and that 100% TNZ has a conductivity of $1.6 \times 10^7$ ohm-cm. The TNZ also appeared to provide better compatibility with the mineral oil dispersion base vehicle. Levels of less than 5% MNT could not be dispersed in the mineral oil even at 200° F. and high agitation. MNT at levels of greater than 5% in mineral oil was sufficiently distributed to give a consistent reading.

EXAMPLE 3

The comparative thermal stability and conductivity of 100 gram samples of neat combined organometallics MNT and TNZ were tested at room temperature (77° F.) and at 450° F. and 525° F. in a forced air oven for one hour and then cooled to room temperature (77° F.). The practical upper limit of the oven is 525° F.

Test specimens of the neat organometallics were prepared by doctor blading a uniform film of about 2 mil thickness when possible unto a 6 inch square of LLDPE film and then placed on the 5½ inch diameter electrode plate. The results are shown on the following table:

TABLE 3

| | MNT | TNZ |
|---|---|---|
| Thermal Stability | | |
| Weight @ 77° F., g | 25.00 | 25.00 |
| Weight @ 525° F., g | 13.75 | 13.65 |
| Weight loss, g | 11.25 | 11.35 |
| Form @ 77° F. | liquid | liquid |
| Form @ 77° F. after 450° F. | thick paste | liquid |
| Appearance - 450° F. | dark brown-black | clear amber |
| Form @ 77° F. after 525° F. | gummy solid | liquid thin gel on top |
| Appearance - 525° F. | dark brown-black | clear amber |
| Conductivity | | |
| Surface Resistivity, ohm-cm | | |
| 77° F. | $1.1 \times 10^7$ | $1.6 \times 10^7$ |
| Voltage/Range Setting | 2 M/200 M | 2 M/200 M |
| 450° F. | $8.6 \times 10^8$ | $8.6 \times 10^7$ |
| Voltage/Range Setting | 200 M/20 | 20 M/2 |
| 525° F. | No Reading | $1.2 \times 10^9$ |
| Voltage/Range Setting | —/— | 200 M/2 |

Table 3 shows that after 450° F. exposure, the MNT turned into an unacceptable thick, dark brown-black paste while the TNZ remained clear amber and after 525° F. exposure, the MNT was a gummy solid and a test specimen could not be doctor-bladed for measurements while the TNZ sample had a thin amber gel layer on top of clear amber liquid underneath which could readily be doctor-bladed into a test specimen. The MNT exhibited an acceptable surface resistivity reading at 450° F. exposure of 8.6×10⁸ ohm-cm while the TNZ exhibited a reading of 8.6×10⁷ ohm-cm. The TNZ exposed to 520° F. showed an acceptable resistivity reading of $1.2\times10^9$ ohm-cm.

EXAMPLE 4

The thermal stability and conductivity of 10% organometallics MNT and TNZ dispersed in mineral oil were tested after exposure to 500° F. for one hour in a forced air oven.

The 10% TNT/mineral oil specimen, when exposed to 500° F., separated into two distinct phases with the bottom phase becoming an unacceptable-appearing dark brown gummy mass. The supernatant liquid was poured off and then equal portions of the supernatant liquid and remaining bottoms were stirred together to make a supernatant/bottoms mixture. Surface resistivity readings of 1.5 mil doctor bladed films are described in Table 4:

TABLE 4

| Test Specimen | Surface Resistivity, ohm-cm | Test Settings | | Gardner Color |
|---|---|---|---|---|
| | | Voltage | Range | |
| Exposed to 77° F. Only | | | | |
| 10% MNT/M.O. | $3.1 \times 10^9$ | 10 | 200 M/20 | 6 |
| 10% TNZ /M.O. | $9.5 \times 10^9$ | 10 | 200 M/20 | 4 |
| Exposed to 500° F.-1 hr. | | | | |
| 10% MNT/M.O. | | | | |
| a) Supernatant Portion | $8.7 \times 10^{11}$ | 100 | 2 G/200 | 5 |
| b) Supernatant/ Bottoms Mixture | $2.6 \times 10^{10}$ | 100 | 2 M/2 | 5 to >18 |
| c) Bottoms Gummy Portion | $4.8 \times 10^8$ | 100 | 20 M/2 | >18 |
| 10% TNZ/M.O. | $6.6 \times 10^9$ | 10 | 200 M/20 | 6 |

The MNT/M.O. data show a surface resistivity of $4.8\times10^8$ ohm-cm for the dark-brown gummy bottoms portion; $8.7\times10^{11}$ ohm-cm for the supernatant portion; and $2.6\times10^{10}$ ohm-cm for the mixture of the supernatant and bottoms portions.

The 10% TNZ/mineral oil specimen changed little from an acceptable Gardner Color of 4 to an acceptable Gardner Color of 6 after exposure to 500° F. for one hour. The surface resistivity of doctor bladed thin films of the TNZ based test specimens remained essentially unchanged exhibiting a reading of $9.5\times10^9$ ohm-cm when exposed to ambient 77° F. and $6.6\times10^9$ ohm-cm when exposed to 500° F. for one hour and then cooled to ambient 77° F. for measurement. When exposed to 500° F. for 1 hour, 250 gms of the TNZ sample was unaffected while the 250 gm sample of MNT had separated into two phases with the bottom portion being a dark-brown lumpy mass. A slurried mixture of the bottom and supernatant portions was made into a mixture for testing.

EXAMPLE 5

Since the MNT was not soluble at low levels in mineral oil and separated when exposed to 500° F. for 1 hour, dioctylphthalate, a widely used plasticizer-particularly in PVC, was used as a vehicle to test conductivity and thermal stability of MNT and TNZ.

Both the MNT and TNZ were soluble in the DOP and the 250 gm MNT sample did not phase separate after exposure to 500° F. for 1 hour. The results are shown in Table 5:

TABLE 5

| Test Specimen | Surface Resistivity, ohm/cm | Test Settings | | Gardner Color |
|---|---|---|---|---|
| | | Voltage | Range | |
| Exposed to 77° F. Only | | | | |
| 10% MNT/DOP | $1.2 \times 10^9$ | 10 | 20 M/20 | 4 |
| 10% TNZ/DOP | $7.1 \times 10^8$ | 10 | 20 M/2 | 3 |
| Exposed to 500° F.-1 hr. | | | | |
| 10% MNT/DOP | $1.2 \times 10^9$ | 10 | 20 M/2 | 13 |
| 10% TNZ/DOP | $5.3 \times 10^8$ | 10 | 2 M/1 | 1 |

The Gardner Color for the MNT sample changed from an acceptable Gardner Color of 4 to an unacceptable Gardner Color of 13, even though conductivity was unaffected exhibiting $1.2\times10^9$ ohm-cm before and after exposure. Surprisingly, the TNZ sample improved from a Gardner 3 to a Gardner 1 after 500° F. exposure for 1 hr. while resistivity improved slightly from $7.1\times10^8$ to $5.3–10^8$ ohm-cm.

EXAMPLE 6

TNZ and MNT, both as 60% active powder masterbatches on fine silica, were prepared in a Henschel type mixer and then incorporated at a 3% level into linear low density polyethylene (LLDPE) (Union Carbide Corporation grade GRSN-9820 NT 7) on a two roll mill at 300° F., sheeted off at ¼" thickness and cut into approximately 8 inch squares and then pressed into 0.15 mm thick test sheets at 350° F. and 40,000 psi on an electrically heated hydraulic press designed for the purpose. The color, transparency and appearance of the 3% of 60% active TNZ sample was indistinguishable from the LLDPE control while the 8% of 60% active MNT had the characteristic good transparency, but with a very light tan tint in the thicker part of at the top of the mold. After six months, the 3% TNZ sample showed no aging and was as good as the LLDPE control.

A full study was then undertaken and the resistivity results are shown in Table 6 with the lowest of three readings reported for each side of the pressed film:

TABLE 6

| Percent TNZ* | Resistivity, ohm-cm | |
|---|---|---|
| | Surface | Volume |
| Control | | |
| Side 1 | $1.2 \times 10^{12}$ | $2.2 \times 10^{17}$ |
| Side 2 | $1.0 \times 10^{12}$ | $1.0 \times 10^{17}$ |
| 1.0 | | |
| Side 1 | $1.2 \times 10^{12}$ | $1.5 \times 10^{11}$ |
| Side 2 | $1.2 \times 10^{12}$ | $1.6 \times 10^{10}$ |
| 2.5 | | |
| Side 1 | $3.7 \times 10^{11}$ | $2.4 \times 10^9$ |
| Side 2 | $5.4 \times 10^{11}$ | $1.2 \times 10^9$ |
| 5.0 | | |
| Side 1 | $8.0 \times 10^{11}$ | $1.5 \times 10^9$ |
| Side 2 | $6.1 \times 10^{11}$ | $1.2 \times 10^{10}$ |
| 10.0 | | |
| Side 1 | $1.3 \times 10^{11}$ | $4.2 \times 10^8$ |
| Side 2 | $1.2 \times 10^{11}$ | $2.6 \times 10^8$ |

TABLE 6-continued

| | Resistivity, ohm-cm | |
|---|---|---|
| Percent TNZ* | Surface | Volume |
| 20.0 | | |
| Side 1 | $6.3 \times 10^{10}$ | $3.2 \times 10^8$ |
| Side 2 | $6.2 \times 10^{10}$ | $4.1 \times 10^8$ |

*60% active on silica

The resultant films containing 1.0, 2.5, 5.0, 10.0 and 20.0% of the 60% active TNZ were surprisingly each indistinguishable from each other and were clear and as colorless as the LLDPE control. Importantly, the volume resistivity dropped from $2.2 \times 10^{17}$ ohm-cm for the control to $1.5\% \times 10^{11}$ ohm-cm with just 1% of the 60% active TNZ.

EXAMPLE 7

Glycol modified polyethylene terephthalate glycol (Eastman Kodak PETG 6763) pellets were placed into a stainless steel Henschel mixer and mixed at slow speed (vari-speed range of 1800 to 3600 rpm) with cooling water on the jacket. 5.5% of MNT was poured slowly through the top of the Henschel into the vortex to produce a batch of 5.5% combined organometallic MNT wetted PETG. The process was repeated twice more using 5.5% MNT and 5.5% TNZ. The resultant three batches of wetted PETG pellets were then compounded independently on a twin screw-extruder, pelletized and then injection molded at 482° F. into 2.37 inch diameter by 0.06 inch thick discs suitable for measuring resistivity.

The discs containing 5.5% MNT and 5.5% DNT had distinct tan tints while the 5.5% TNZ disc was clear and colorless. The MNT disc showed $3.1 \times 10^{12}$ ohm-cm surface resistivity and the DNT disc showed $1.1 \times 10^{13}$ ohm-cm surface resistivity, but both were deemed commercially unacceptable solely on the basis of their tan color appearance. The TNZ disc gave $1.2 \times 10^{12}$ ohm-cm surface resistivity and excellent color.

EXAMPLE 8

TNZ 60% active powder levels of from 2.5 to 6.0% were mixed with Polyethersulphone (PES) resin (BASF Ultrason E3010) in a Henschel mixer and extrusion injection molded at 650° F. The surface resistivity results are shown in Table 7:

TABLE 7

| Dosage of TNZ* % | Surface Resistivity, ohm-cm |
|---|---|
| 2.5 | $1 \times 10^{15-14}$ |
| 3.0 | $1 \times 10^{14}$ |
| 4.0 | $1 \times 10^{13}$ |
| 5.0 | $1 \times 10^{12-11}$ |
| 6.0 | $1 \times 10^{10}$ |

*60% active powder on silica

The above table clearly shows the effectiveness of the composition of the invention in reducing the resistivity of PES.

EXAMPLE 9

Paracril OZO containing 70% nitrile rubber and 30% PVC was mixed with 40 phr of Hycar 1312 (butadiene-acrylonitrile copolymer liquid, B. F. Goodrich) and 10 phr of Plasthall 7050 (glutarate, diester monomer plasticizer, C. P. Hall Co.) and 5 parts MNT. This mixture, and a control not containing the MNT, were compression molded at 320° F. with metal inserts.

The volume resistivity of control was $1 \times 10^{18}$ ohm-cm, while the rubber compounded with the MNT had a volume resistivity of only $1 \times 10^6$ ohm-cm. In addition, the latter had an outstanding dielectric strength of 126.

The molded compositions were rolls of clear rubber with good color, except for brown spots forming around the metal inserts where the temperatures during molding exceed 350° F. When TNZ was substituted for the MNT in equal amounts, the brown spots did not form.

EXAMPLE 10

Six sheets of flexible PVC based on the formulations shown below were prepared:

TABLE 8

| | 1 | 2 | 3 | 4 | 5 | 6 |
|---|---|---|---|---|---|---|
| PVC (Geon 124) | 100 | 100 | 100 | 100 | 100 | 100 |
| DOP | 25 | 25 | 25 | 25 | 25 | 25 |
| Tin-based stabilizer[1] | 2 | — | 2 | — | 2 | — |
| Ca,Zn-based stabilizer[2] | — | 2 | — | 2 | — | 2 |
| MNT | — | — | 6 | 6 | — | — |
| TNZ | — | — | — | — | 6 | 6 |

1. Mark 275 (Witco)
2. Mark 4072 (Witco)

Test specimens were prepared by mixing together the ingredients in a Henschel mixture at 1800 rpm for 3 minutes to form a uniform powder blend. The blend was then added to a two roll mill at 275° F. and compounded until the materials were uniformly dispersed. Thereafter, the sheets from the mill were cut into 8 inch squares and hydraulically pressed at 325° F. ad 40,000 psi into uniform 3 mil thick test sheets.

The surface resistivity and volume resistivity of each of the samples was tested twice and the average values given in the following table:

TABLE 9

| Sample No. | Surface Resistivity | Voltage | Range | Volume Resistivity | Voltage | Range |
|---|---|---|---|---|---|---|
| 1 | $8.0 \times 10^{15}$ | 100 | 2 T/200 K | $2.0 \times 10^{13}$ | 100 | 20 G/2 K |
| 2 | $1.3 \times 10^{16}$ | 100 | 2 T/200 K | $2.0 \times 10^{13}$ | 100 | 20 G/2 K |
| 3 | $1.7 \times 10^{12}$ | 10 | 20 G/2 K | $2.0 \times 10^{10}$ | 10 | 20 G/2 K |
| 4 | $8.5 \times 10^{12}$ | 10 | 200 G/20 K | $6.1 \times 10^{10}$ | 10 | 20 G/2 K |
| 5 | $3.4 \times 10^{14}$ | 10 | 200 G/20 K | $1.3 \times 10^{11}$ | 10 | 20 G/2 K |
| 6 | $4.5 \times 10^{13}$ | 10 | 2 T/200 K | $2.0 \times 10^{11}$ | 10 | 20 G/2 K |

While both antistats improved the resistivity to substantially the same degree, observation showed that the color of the samples containing the compound of the invention (Sample Nos. 5 and 6) was improved substantially more than the MNT-containing compound, particularly with the calcium-zinc stabilizer.

EXAMPLE 11

Using formulations 3 and 5 set forth in Example 1 0, the heat of the press was increased to 350° F. and 365° F., respectively. The surface resistivity and volume resistivity are shown on the following table:

TABLE 10

| Sample | Surface Resistivity | Voltage | Range | Volume Resistivity | Voltage | Range |
|---|---|---|---|---|---|---|
| No. 3 6% MNT 350° F. | $5.8 \times 10^{11}$ | 10 | 200 G/20 K | $3.8 \times 10^{10}$ | 10 | 20 G/2 K |
| No. 5 6% TNZ 350° F. | $7.4 \times 10^{14}$ | 10 | 200 G/20 K | $8.0 \times 10^{11}$ | 10 | 200 G/20 K |
| No. 3 6% MNT 365° F. | $7.5 \times 10^{11}$ | 10 | 2000 G/20 K | $3.1 \times 10^{10}$ | 10 | 20 G/2 K |
| No. 5 6% TNZ 365° F. | $4.5 \times 10^{14}$ | 100 | 200 G/20 K | $3.0 \times 10^{11}$ | 10 | 200 G/20 K |

At 350° F. the material of the invention clearly had far superior color as contrasted to the color achieved with the corresponding titanate. At 360° F., the PVC itself reached the limit of thermal stability and the color properties of the film started to deteriorate.

EXAMPLE 12

To test the effect on volume resistivity, surface resistivity and color, varying amounts of the TNZ of the invention and MNT were added to a film-forming material, namely, a commercial nail polish. The nail polish contained the following compounds: ethyl acetate, isopropyl alcohol, butyl acetate, propyl acetate, nitrocellulose acrylate copolymers, sucrose benzoate, dibutyl phthalate, cellulose acetate butyrate, camphor etocrylene, gelatin, nylon, benzophernone-1 and violet 2.

The mixtures were thereafter poured onto a polyethylene sheet and permitted to dry. The following table shows the average of two surface resistivity and volume resistivity measurements made for the six samples:

TABLE 11

| | Surface Resistivity | Voltage | Range | Volume Resistivity | Voltage | Range |
|---|---|---|---|---|---|---|
| Control N.S. N.S./TNZ | $>10^{16}$ | 500 V | 2 T/200 K | $1.1 \times 10^{14}$ | 100 V | 200 G/20 K |
| 0.3% | $7.5 \times 10^{14}$ | 100 V | 200 G/20 K | $1.6 \times 10^{13}$ | 100 V | 200 G/20 K |
| 2% | $7.0 \times 10^{15}$ | 100 V | 20 G/2 K | $1.73 \times 10^{10}$ | 100 V | 20 G/2 K |
| 4% | $3.2 \times 10^{14}$ | 100 V | 200 G/20 K | $8.7 \times 10^{10}$ | 100 V | 20 G/2 K |
| 6% | $3.93 \times 10^{12}$ | 10 V | 20 G/2 K | $4.2 \times 10^{9}$ | 10 V | 200 M/20 |
| N.S./MNT | | | | | | |
| 0.3% | $7.5 \times 10^{16}$ | 500 V | 200 G/20 K | $5.1 \times 10^{13}$ | 500 V | 200 M/20 |
| 2% | $6.8 \times 10^{15}$ | 500 V | 200 M/20 | $1.5 \times 10^{10}$ | 100 V | 200 M/20 |
| 4% | $2.6 \times 10^{12}$ | 10 V | 2 G/200 | $4.9 \times 10^{8}$ | 10 V | 200 M/20 |
| 6% | $26 \times 10^{13}$ | 500 V | 200 M/20 | $5.1 \times 10^{7}$ | 10 V | 20 M/2 |

The above data further show the efficacy of the invention in conjunction with a cast film. The compound of the invention, TNZ, again gave superior color properties as compared to the related titanate compounds. Again, resistivity reduction is noted with the addition of both organometallic compounds.

We claim:

1. An antistatic agent comprising a trineoalkoxy amino zirconate and a trineoalkoxy sulfonyl zirconate, wherein said zirconates have the following formulas:

$$(RR_1R_2C—CH_2—O)_3ZrA \qquad (I)$$

$$(RR_1R_2C—CH_2—O)_3ZrB \qquad (II)$$

wherein R, $R_1$, $R_2$ are each a monovalent alkyl, alkenyl, alkynyl, aralkyl, aryl or alkaryl group having up to 20 carbon atoms or a halo- or ether-substituted derivative thereof; and A is either an oxyalkylamino group of the formula —(—O-$R_4$-N($R_5$)($R_6$)) or an oxyaryl amino group of the formula —(—OArN($R_5$)($R_6$)), 10 and B is a arylsulfonyl group of the formula (ArS(O)$_2$O—)— or an alkyl sulfonyl group of the formula (R-S(O)$_2$O—); 12 wherein R, $R_1$, and $R_2$ each contain up to three ether oxygen or halogen substituents, provided the total number of carbon atoms for each such R group does not exceed 20, inclusive of the carbon atoms contained in substituent portions;

wherein $R_4$ is a divalent alkylene group which may contain in the chain oxygen and nitrogen atoms;

wherein $R_5$ and $R_6$ are each hydrogen or hydrocarbyl groups as defined for R, $R_1$ and $R_2$ above; and wherein Ar is a monovalent aryl or alkaryl group having from 6 to about 20 carbon atoms, optionally containing up to 3 ether oxygen substituents, and substituted derivatives thereof wherein the substitutions are up to a total of 3 halogens or amino groups having the formula $NR_8R_9$ wherein $R_8$ and $R_9$ are each hydrogen, an alkyl group having 1 to 12 carbon atoms, an alkenyl group having from 2 to 8 carbon atoms, a cycloalkyl group having from 3 to 12 carbon atoms, and an aryl group having from 6 to 12 carbon atoms.

2. The antistatic agent of claim 1 wherein the trineoalkoxy amino zirconate and trineoalkoxy sulfonyl zirconate are in a weight ratio of from 0.2:1 to 1.8:1.

3. The antistatic agent of claim 1 wherein the trineoalkoxy amino zirconate and trineoalkoxy sulfonyl zirconate are dispersed or dissolved in a liquid medium.

4. The antistatic agent of claim 1 wherein the trineoalkoxy amino zirconate and trineoalkoxy sulfonyl zirconate are dispersed on a carrier.

5. The antistatic agent of claim 4 wherein the carrier is silica.

6. The antistatic agent of claim 3 wherein the liquid medium is neopentyl glycol, 2-ethyl hexanol, or dodecylbenzene.

7. The antistatic agent of claim 3 wherein the liquid medium contains from 0.3 to 8.0 wt. % of the zirconate compounds.

8. The antistatic agent of claim 4 wherein the antistatic agent contains 35 to 90 wt. % of silica based on the total weight of the zirconate compounds.

9. The antistatic agent of claim 8 wherein the antistatic agent contains from 37 to 63 wt. % silica.

10. An antistatic composition comprising a polymeric material containing admixed therewith antistatic agent which is an admixture of a trineoalkoxy amino zirconate and a trineoalkoxy sulfonyl zirconate, wherein said zirconates have the following formulas:

$(RR_1R_2C—CH_2—O)_3ZrA$      (I)

$(RR_1R_2C—CH_2—O)_3ZrB$      (II)

wherein R, $R_1$, $R_2$ are each a monovalent alkyl, alkenyl, alkynyl, aralkyl, aryl or alkaryl group having up to 20 carbon atoms or a halo- or ether-substituted derivative thereof; and A is either an oxyalkylamino group of the formula —(—O-$R_4$-N($R_5$)($R_6$)) or an oxyaryl amino group of the formula —(—OArN($R_5$)($R_6$)), and B is a arylsulfonyl group of the formula (ArS(O)$_2$O—)— or an alkyl sulfonyl group of the formula (R-S(O)$_2$O—);

wherein R, $R_1$, and $R_2$ each contain up to three ether oxygen or halogen substituents, provided the total number of carbon atoms for each such R group does not exceed 20, inclusive of the carbon atoms contained in substituent portions;

wherein $R_4$ is a divalent alkylene group which may contain in the chain oxygen and nitrogen atoms;

wherein $R_5$ and $R_6$ are each hydrogen or hydrocarbyl groups as defined for R, $R_1$ and $R_2$ above; and wherein Ar is a monovalent aryl or alkaryl group having from 6 to about 20 carbon atoms, optionally containing up to 3 ether oxygen substituents, and substituted derivatives thereof wherein the substitutions are up to a total of 3 halogens or amino groups having the formula $NR_8R_9$ wherein $R_8$ and $R_9$ are each hydrogen, an alkyl group having 1 to 12 carbon atoms, an alkenyl group having from 2 to 8 carbon atoms, a cycloalkyl group having from 3 to 12 carbon atoms, and an aryl group having from 6 to 12 carbon atoms.

11. The composition of claim 10 wherein the polymeric material is an acrylonitrile-butadiene-styrene (ABS), acetal, acrylic, cellulose ester, ethylene copolymer, fluorocarbon, phenolic, polyamide, polycarbonate, polyester, polyether, polyolefin, polysulfone, polyurethane, polyvinyl chloride (PVC), styrene, alpha-methyl styrene, styrene-butadiene (SB), ethylene-propylene rubber (EPR), ethylene-propylene-diene rubber (EPDM), isobutylene-isoprene rubber (IIR), styrene-butadiene rubber (SBR), natural rubber (NR), chlorinated polyethylene (CPE), chlorosulfonated polyethylene, halo butylene, silicone, polysulfide, epichlorohydrin, alkyd, epoxy, furane, nitrocellulose, phenolic, or vinyl ester.

12. The composition of claim 10 wherein the antistatic agent is present in an amount of from 100 to 80,000 parts per million based on polymeric material.

13. The composition of claim 12 wherein the antistatic agent is present in an amount of from 200 to 4500 ppm based on polymeric material.

14. The composition of claim 11 wherein the polyolefin is a polymer of an olefin containing from 2 to 6 carbon atoms, a copolymer of said polyolefin, or a terpolymer of said polyolefin.

15. The composition of claim 14 wherein the polyolefin is polyethylene, polypropylene, a copolymer of ethylene and propylene, or a terpolymer of ethylene, propylene and a diene.

16. The composition of claim 11 wherein the polymeric material a polymer of styrene, alpha-methyl styrene, or a copolymer of butadiene-styrene, styrene-acrylonitrile or butadiene-styrene.

* * * * *